United States Patent [19]

Smith

[11] 4,060,154
[45] Nov. 29, 1977

[54] DISC BRAKES CALIPER AND SUPPORT STRUCTURE

[75] Inventor: George Windsor Smith, Studley, England

[73] Assignee: Girling Limited, Birmingham, England

[21] Appl. No.: 772,292

[22] Filed: Feb. 25, 1977

Related U.S. Application Data

[63] Continuation of Ser. No. 607,021, Aug. 22, 1975, abandoned.

[30] Foreign Application Priority Data

Aug. 28, 1974 United Kingdom .............. 37517/74

[51] Int. Cl.² .......................................... F16D 55/224
[52] U.S. Cl. .................................. 188/73.3; 188/73.5; 188/73.6
[58] Field of Search ................... 188/18 A, 71.1, 72.4, 188/72.5, 73.3, 73.5, 73.6

[56] References Cited

U.S. PATENT DOCUMENTS

| | | | |
|---|---|---|---|
| 3,346,075 | 10/1967 | Swift | 188/73.3 |
| 3,424,224 | 1/1969 | Swift | 188/73.3 |
| 3,848,709 | 11/1974 | Tourneur | 188/73.3 |
| 3,881,576 | 5/1975 | Haraikawa et al. | 188/73.3 |
| 3,915,263 | 10/1975 | Courbot | 188/73.3 |
| 3,917,033 | 11/1975 | Rath et al. | 188/73.3 |
| 3,930,564 | 1/1976 | Kobayashi et al. | 188/73.3 |
| 3,935,927 | 2/1976 | Haraikawa | 188/73.3 |
| 3,976,169 | 8/1976 | Ogawa | 188/73.3 |

Primary Examiner—Trygve M. Blix
Assistant Examiner—Edward R. Kazenske
Attorney, Agent, or Firm—Scrivener, Parker, Scrivener & Clarke

[57] ABSTRACT

The invention provides a sliding caliper disc brake in which a caliper carrying an indirectly operated friction pad assembly is slidably mounted on a single pin relative to a fixed torque plate carrying a directly operated friction pad assembly, at least one further pin being provided for retaining the friction pad assemblies in position in relation to the caliper and torque plate respectively and the further pin, or at least one of the further pins when more than one is provided, being arranged to prevent rotation of the caliper about the drag transmitting pin.

11 Claims, 4 Drawing Figures

-FIG. 1.-

DISC BRAKES CALIPER AND SUPPORT STRUCTURE

This is a continuation of application Ser. No. 607,021 filed Aug. 22, 1975, now abandoned.

The present invention relates to disc brakes and is particularly concerned with sliding caliper disc brakes.

Sliding caliper disc brakes are known in which a caliper carrying an indirectly operated friction pad assembly is slidably mounted on a pair of pins relative to a fixed torque plate carrying a directly operated friction pad assembly, at least one further pin being provided for retaining the friction pad assemblies in position in the caliper and torque plate respectively. In such brakes, it is conventional for the majority of the drag force on the indirectly operated pad assembly to be transferred to the torque plate by one only of the pins in said pair, the other pin of said pair being provided primarily to prevent rotation of the caliper about the drag transmitting pin.

It is one object of the present invention to simplify the aforegoing known arrangement.

In accordance with the present invention there is provided a sliding caliper disc brake in which a caliper carrying an indirectly operated friction pad assembly is slidably mounted on a single pin relative to a fixed torque plate carrying a directly operated friction pad assembly, at least one further pin being provided for retaining the friction pad assemblies in position in the caliper and torque plate respectively and said further pin, or at least one of said further pins when more than one is provided, being arranged to prevent rotation of the caliper about the drag transmitting pin.

The invention is described further hereinafter, by way of example, with reference to the accompanying drawings, in which.

Figure 1:
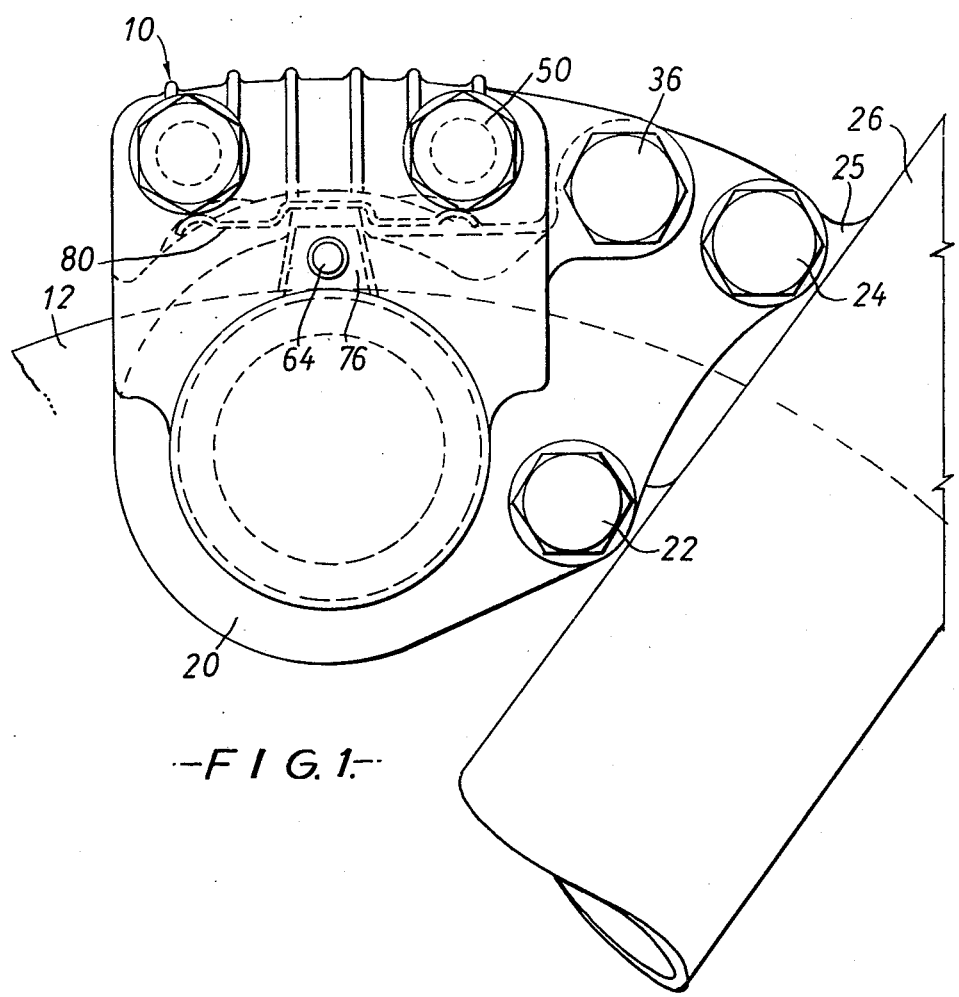
FIG. 1 is a front elevation of one embodiment of a disc brake in accordance with the invention, which is designed for use on a motor cycle and is illustrated in its operative position attached to the front forks of a motor cycle.
Figure 2:
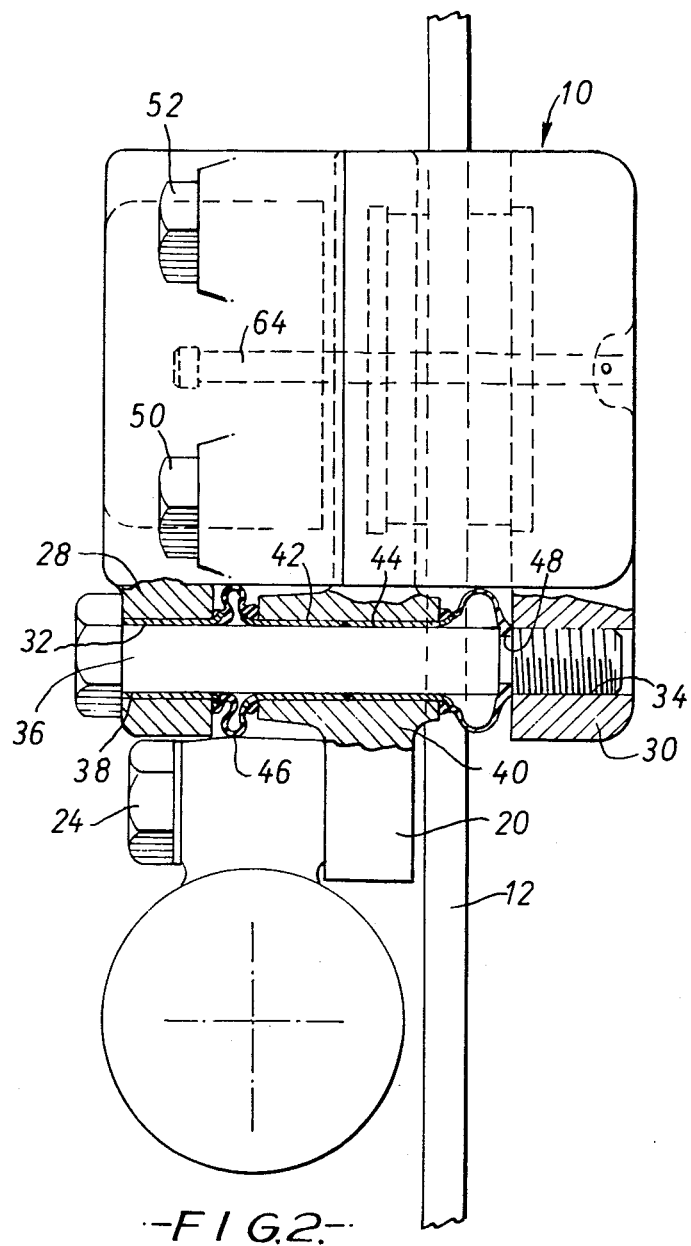
FIG. 2 is a partially sectioned top view of the disc brake of FIG. 1.
Figure 3:
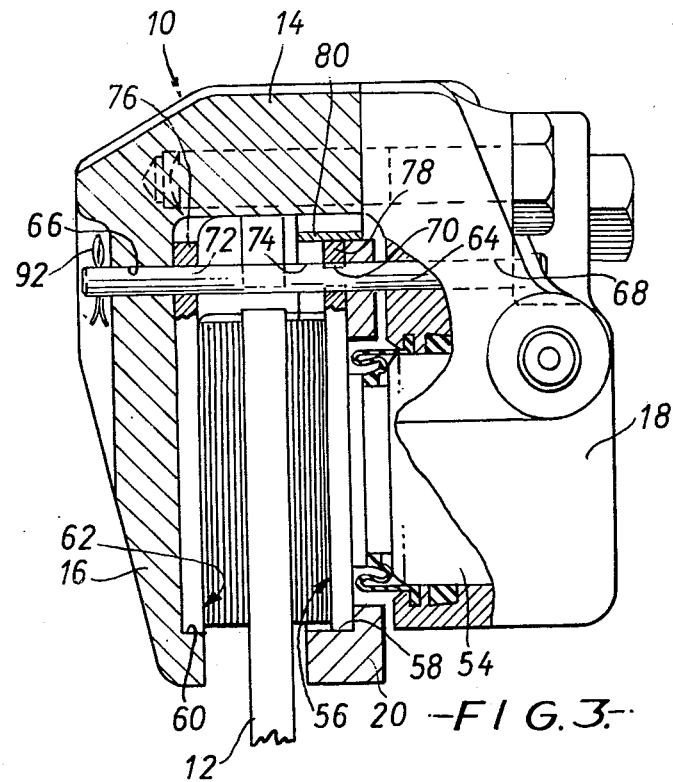
FIG. 3 is a partially cut-away and partially sectioned view of the disc brake of FIG. 1.

The disc brake illustrated in FIGS. 1, 2 and 3 comprises a U-shaped caliper member generally designated 10 which straddles a brake disc 12, the caliper member 10 including a bridge portion 14 located radially outwardly of the disc 12 and a pair of generally radially inwardly extending limbs 16, 18 located on either side respectively of the disc. The caliper member 10 is mounted for sliding movement on a torque plate 20 which is rigidly clamped by bolts 22, 24 to part of the frame of a vehicle, in this instance to projections 25 on the front forks 26 of a motor cycle, so as to lie adjacent one side of the disc 12. The caliper member includes a pair of laterally projecting lugs 28, 30 having coaxially aligned apertures 32, 34 therein for receiving a drag pin (pivot bolt) 36 supported by a bush 38 in the aperture 32 and having a screw-threaded connection with the aperture 34 in the lug 30. A boss 40, located on the torque plate 20 radially outwardly of the disc 12, extends partially over the periphery of the disc, as best seen in FIG. 2, and has an axial bore therein which receives the drag pin 36 via a pair of bushes 42, 44, whereby to support the caliper member 10 for axial movement relative to the torque plate 20. In order to protect the sliding surfaces against the ingress of dirt, water and other foreign matter, a first flexible rubber boot 46 is connected between the bushes 32 and 42 and a second flexible rubber boot is connected between the bush 44 and an annular recess 48 in the drag pin 36.

The bridge portion 14 of the caliper member 10 is formed in two parts which are clamped together by a pair of bridge bolts 50, 52. The right hand limb 18, as viewed in FIG. 3, carries a single hydraulic actuating piston 54 adapted to actuate a directly operated friction pad assembly 56 supported in a circular recess 53 in the torque plate 20. The left hand limb 16 of the caliper member 10 remote from the piston 54 has a similarly shaped circular recess 60 in which is located an indirectly operated friction pad assembly 62.

Drag taken during operation of the brake by the directly operated pad assembly 56 is transmitted directly to the torque plate 20 while drag from the indirectly operated pad assembly 62 is transmitted to the torque plate 20 via the caliper member 10 and the drag pin 36. The pad assemblies 62, 56 are retained in position by means of a single pad retaining pin 64 which passes through aligned apertures 66, 68 in the caliper limbs 16, 18, an aperture 70 in the torque plate 20 and also through apertures 72, 74 in upstanding ears 76, 78 on respective backing plates of the pad assemblies 62, 56. The pin 64 also acts to prevent the caliper member 10 from rotating about the drag pin 36 by virtue of the drag on the indirect pad assembly.

A spring plate 80 (see FIGS. 1 and 3) is positioned between the caliper member 10 and the torque plate 20 and is arranged to react on the torque plate to load the caliper radially outwardly whereby to take up radial clearances therebetween. It also fits over the top of the directly operated pad assembly to prevent the pad from rattling.

Figure 4:
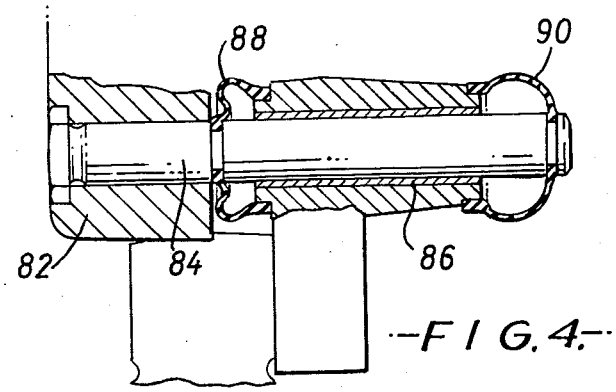
FIG. 4 is a section through a detail of a second embodiment of a disc brake in accordance with the invention.

An alternative means of mounting the caliper member 10 on the torque plate 20 is illustrated in FIG. 4 wherein only one lug 82 is provided on the caliper member 10, the drag pin 84 being a tight fit therein. The pin 84 passes through a bush 86 in the torque plate 20, rubber boots 88, 90 having been provided in the usual manner to prevent the ingress of water or other foreign matter that could cause damage to the sliding surfaces.

In either arrangement, in order to remove the friction pads, a pad retaining pin clip 92 is removed and the retaining pin 64 withdrawn. The caliper member 10 can then be rotated about the drag pin 36 until the caliper member 10 clears the disc 12. This exposes the directly operated pad which can be withdrawn radially outwardly from the torque plate 20 while the indirectly operated pad can be dropped out radially inwardly.

Thus, in the aforegoing arrangement, the pin 64 performs the dual role of preventing rotation of the caliper member 10 about the drag pin 36 and of retaining the friction pad assemblies 56, 62 in position.

In order to enable the piston 54 to be pushed back into the associated cylinder in the caliper when the caliper is to be rotated about the drag pin for pad removal, a short slot (not shown) can be provided in the torque plate adjacent the caliper and opposite the drag pin to allow a suitable tool to be passed therethrough for engaging and displacing the piston.

In other embodiments, more than one pad retaining pin 64 may be provided.

I claim:

1. A sliding caliper brake device for operatively co-operating with a brake disc which is rotatable abouts its central axis, comprising:
   i. a torque plate;
   ii. a caliper slidably connected to the torque plate;
   iii. directly and indirectly operated friction pad assemblies carried by at least one of a pair of members comprising the caliper and torque plate, each friction pad assembly comprising a friction pad carried by a pad backing plate;
   iv. a pair of drag taking abutments positioned to prevent lateral displacement of the friction pad assemblies in response to drag forces generated upon engagement of the pads with the brake disc when the disc is rotating;
   v. a single guide pin mounting the caliper for axial sliding movement relative to the torque plate, said guide pin being:
      a. of cylindrical section;
      b. firmly fixed to one of said pair of members comprising the torque plate and the caliper;
      c. a snug fit in a cylindrical hole in the other of said two members;
      d. not directly contacted by either of said pad backing plates;
      e. adapted such that relative sliding between said caliper and torque plate is effected by relative sliding between said guide pin and said hole, and
   vi. at least one pad retention pin which:
      f. extends through and operatively engages aligned apertures in the caliper, the torque plate and at least one of said pad backing plates such as firstly to directly prevent any movement of the pad carried by said at least one backing plate relative to the caliper and torque plate, in any mode in a plane perpendicular to said central axis of the brake disc, which is not prevented by said drag taking abutments and secondly to directly prevent pivoting of the caliper about said guide pin relative to the torque plate;
      g. is axially located with respect to one of said pair of members by a locking means;
      h. is axially withdrawable upon release of the locking means to facilitate the removal of said pad assemblies to be removed without breaking the sliding connection between the caliper and torque plate; and
      i. is unprotected by boots and sealing means at any aperture through which it passes.

2. A sliding caliper brake device according to claim 1 further including a spring plate positioned between the caliper and the torque plate such that, when the brake device is mounted in position adjacent the periphery of said brake dic, the spring plate reacts on the torque plate to load the caliper radially outwardly for taking up radial clearance therebetween.

3. A sliding caliper brake device according to claim 2 in which the caliper includes two lug portions connected by an intermediate bridge portion and in which the spring plate is located between the underside of the bridge portion of the caliper and an end surface of the torque plate.

4. A sliding caliper brake device according to claim 3 in which said spring plate also fits over the top of the directly operated pad assembly to prevent the latter assembly from rattling.

5. A sliding caliper brake device according to claim 1 comprising a single laterally projecting lug on the caliper having an aperture therein, one end of the guide pin being fixed in said aperture and the other end being slidably received in said hole, said hole being in the torque plate.

6. A sliding caliper brake device according to claim 1 in which the caliper includes a pair of laterally projecting lugs having coaxially aligned apertures for slidably receiving said guide pin, and further comprising a first bush which supports one end of the pin in one of said caliper apertures, the other end of the guide pin being received in the other caliper aperture with a screwthreaded connection therebetween.

7. A sliding caliper brake device according to claim 6 comprising a boss on the torque plate having said hole therein which receives said guide pin whereby to support the caliper for axial movement relative to the torque plate.

8. A sliding caliper brake device according to claim 1 in which said at least one pad retention pin extends through aligned apertures in the caliper, the torque plate and both said pad backing plates.

9. A sliding caliper brake device according to claim 1 wherein said drag taking abutments comprise abutment guides for the directly and indirectly operated friction pad assemblies, respectively, said abutment guides being carried by one of said pair of members constituted by the caliper and the torque plate.

10. A sliding caliper disc brake comprising:
   i. a disc which is rotatable about its central axis;
   ii. a torque plate;
   iii. a caliper slidably connected to the torque plate;
   iv. directly and indirectly operated friction pad assemblies carried by at least one of a pair of members comprising the caliper and torque plate, each friction pad assembly comprising a friction pad carried by a pad backing plate;
   v. a pair of drag taking abutment guides for the directly and indirectly operated friction pad assemblies, said abutment guides being carried by the torque plate and by the caliper, respectively, and being positioned to prevent lateral displacement of the friction pad assemblies in response to drag forces generated upon engagement of the pads with the brake disc when the disc is rotating;
   vi. a single guide pin mounting the caliper for axial sliding movement relative to the torque plate, said guide pin being:
      a. of cylindrical section;
      b. firmly fixed to one of said pair of members comprising the torque plate and the caliper;
      c. a snug fit in a cylindrical hole in the other of said two members;
      d. not directly contacted by either of said pad backing plates;
      e. adapted such that relative sliding between said caliper and torque plate is effected by relative sliding between said guide pin and said hole, and
   vii. a single pad retention pin which:
      f. extends through and operatively engages aligned apertures in the caliper, the torque plate and both said pad backing plates such as firstly to directly prevent any movement of the pads relative to the caliper and torque plate, in any mode in a plane perpendicular to said central axis of the brake disc, which is not prevented by said drag taking abutments, and secondly to directly prevent pivoting of the caliper about said single guide pin relative to the torque plate;

g. is axially located with respect to one of said pair of members by a locking means;

h. is axially withdrawable upon release of the locking means to facilitate the removal of said pad assemblies to be removed without breaking the sliding connection between the caliper and torque plate; and i. is unprotected by boots and sealing means at any aperture through which it passes.

11. A sliding caliper brake device for operatively cooperating with a rotary disc which is rotatable about its central axis comprising a torque plate, a caliper, a single guide pin mounting the caliper for axial sliding movement relative to the torque plate, directly and indirectly operated friction pad assemblies each comprising a friction pad carried by a pad backing plate, a pair of drag taking abutment guides for the directly and indirectly operated friction pad assemblies, respectively, said abutment guides being carried by one of a pair of members constituted by the caliper and the torque plate and being positioned to prevent lateral displacement of the friction pad assemblies in response to drag forces generated upon engagement of the pads with the disc when the disc is rotating, and at least one pad retention pin which extends through and operatively engages aligned apertures in the caliper, the torque plate and at least one of said pad backing plates such as firstly to directly prevent any movement of the pad carried by said at least one backing plate relative to the caliper and torque plate, in any mode in a plane perpendicular to said central axis of the disc which is not prevented by said abutment guides and secondly to directly prevent pivoting of the caliper about said guide pin relative to the torque plate, and wherein the caliper further includes a pair of laterally projecting lugs having coaxially aligned apertures for slidably receiving said single guide pin, a first bush which supports one end of the guide pin in one of said caliper apertures, the other end of the guide pin being received in the other caliper aperture with a screw-threaded connection therebetween, a boss on the torque plate having an axial bore therein which receives said guide pin whereby to support the caliper for axial movement relative to the torque plate, a pair of longitudinally abutting bushes which support the guide pin in said bore in the torque plate boss, and a first flexible boot connected between said first bush and one of said pair of longitudinally abutting bushes and a second boot connected between the other of said pair of longitudinally abutting bushes and an annular recess in the guide pin.

* * * * *